S. G. WINGQUIST.
BALL BEARING.
APPLICATION FILED AUG. 28, 1907.

1,028,844.

Patented June 4, 1912.

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN.

BALL-BEARING.

1,028,844.

Specification of Letters Patent. Patented June 4, 1912.

Application filed August 28, 1907. Serial No. 390,416. REISSUED

*To all whom it may concern:*

Be it known that I, SVEN GUSTAF WINGQUIST, a subject of the King of Sweden, and a resident of Gottenborg, in the Kingdom of Sweden, have invented certain Improvements in Ball-Bearings, of which the following is a specification.

This invention relates to certain improvements in that class of ball bearings wherein a certain degree of universal or compensatory movement is afforded between the inner and outer bearing members to overcome defects in alinement and facilitate the assembling or separation of the parts, and of which the device shown and claimed in my co-pending patent application, Ser. No. 695,681 is a type, and the object of the invention is to provide a bearing of this general character of a simple and comparatively inexpensive nature having a novel and improved construction and arrangement of the bearing rings or members between which the balls are held.

The invention consists in certain novel features of the construction, and combinations and arrangements of the several parts of the improved ball bearing, whereby certain important advantages are attained and the device is rendered simpler, cheaper, and otherwise better adapted and more convenient for use, all as will be hereinafter fully set forth.

The novel features of the invention will be carefully defined in the claim.
In order that my improvements may be better understood I will now proceed to describe my invention with reference to the accompanying drawings, wherein—

Figure 1:
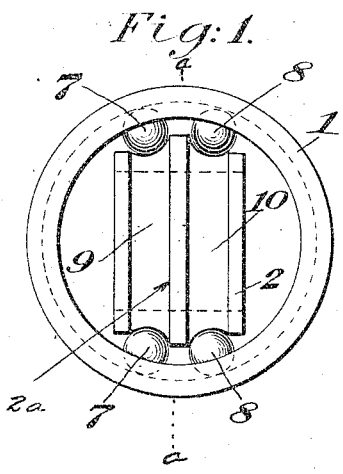
Figure 2:
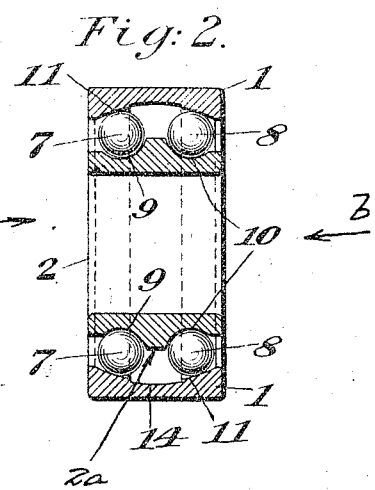
Figure 3:
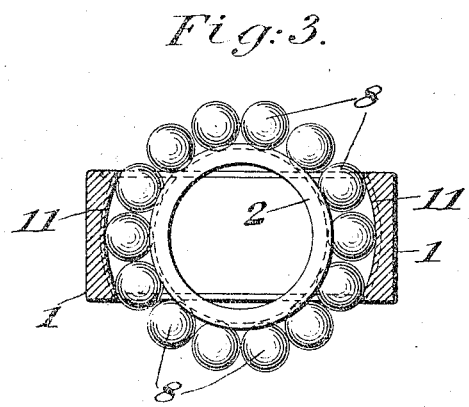
Figure 4:
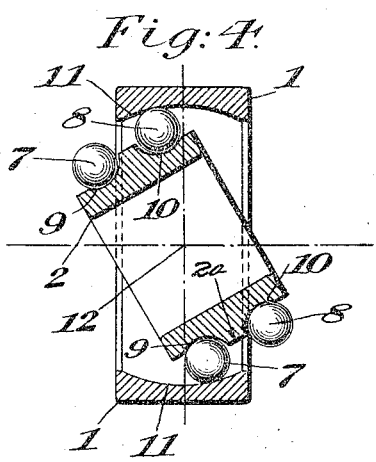
Figure 5:
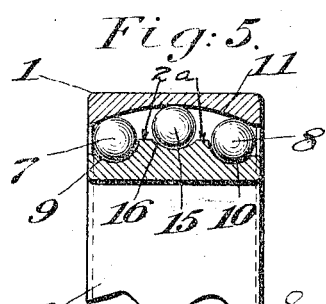

Figure 1 is a view of one embodiment of my invention showing the inner and outer rings or members of the bearing moved relatively to each other in position to permit the introduction or removal of the balls between them; Fig. 2 is a sectional view taken diametrically through the bearing; Fig. 3 is a sectional view taken diametrically through the outer ring or member of the bearing, in the plane indicated by the line $a$—$a$ in Fig. 1, the inner ring or member being shown in elevation; Fig. 4 is a sectional view similar to Fig. 2, the inner member being moved to an angular position adapted to permit introduction or removal of the balls; and Fig. 5 is a fragmentary sectional view similar to Fig. 2, but illustrating a modified construction of the improved bearing.

In these views 1 represents the outer ring or member of the improved bearing, and 2 represents the inner ring or member, which is adapted to be threaded upon a shaft or which may be constructed as an integral part of such shaft. Each of these rings or members 1 and 2 is formed of an integral annular part, and the outer ring or member 1 is provided upon its inner face with tracks 11, 11, which are extended around the inner surface of said outer member in annular form and parallel with each other, and which present internal concentric spherical bearing surfaces which are struck from the same center point 12, which is positioned at the rotative axis of the inner ring or member 2, as indicated in Fig. 4, the spherical bearing surface of one such track 11 forming substantially a continuation of the spherical bearing surface of the other track 11. The formation of the outer ring or member from a single or integral piece of metal permits these tracks and their bearing surfaces to be produced in its interior with the greatest possible accuracy and to be uniformly and properly tempered, and assures their retention in fixed relation during the entire life of the bearing, so that they may not be misplaced accidentally or by reason of unskillful or careless assembling of the parts.

As in the structure shown and claimed in my co-pending patent application, Ser. No. 695,681, the inner ring 2 is of a diameter sufficiently small to permit the same to be turned freely and with a universal movement around the center point 12 and within the outer ring or member 1, and said inner ring or member 2 is provided with a central annular enlargement $2^a$ extended around its central portion, at opposite sides of which enlargement, the peripheral surface of said member 2 is provided with parallel annular grooves or channels 9 and 10, adapted to receive two annular series of balls 7 and 8, respectively, the structure being such that, when the parts are assembled with the said two series of balls engaged in the respective grooves of the inner ring or member, said inner ring or member 2 is adapted for universal movement inside of the outer ring or member 1, each series of balls 7 and 8 being adapted, during such universal movement;

to freely traverse the spherical bearing surfaces of the respective tracks 11 11 of the outer ring or member in both circumferential and transverse directions.

The inner ring or member 2, and its two series of balls, 7 and 8, are so arranged with relation to the spherical bearing surfaces of the tracks 11, 11 of the outer ring or member 1, that the center from which such spherical bearing surfaces of said tracks 11, 11 are struck is positioned substantially midway between the respective series of balls 7 and 8, which are thereby caused to traverse parallel paths at opposite sides of such center, so that in the use of the improved bearing, the stress exerted by the rotative part or element is divided and imposed uniformly upon each series of balls 7 and 8.

The annular grooves or channels 9 and 10 for the inner ring or member 2 afford tracks which are traversed by the balls of the two annular series 7 and 8, and as herein shown, such grooves or channels are formed with concave curved surfaces in profile struck with radii greater than those of the balls traversing them, so that each ball in each series 7 and 8 contacts with the track of the inner member 2 only at a single point opposite to that whereat it contacts with the corresponding track of the outer member, whereby a regulated rolling movement of the balls during the use of the improved bearing is assured, and the wear resulting from such usage is distributed uniformly over the surfaces of the balls and is not imposed thereon in such an unequal manner as would tend to cut into or deform the surfaces of said balls. By this construction and arrangement of the parts it will be evident that the annular tracks or bearing surfaces 11, 11, wherewith the respective ball sets or series 7 and 8 are engaged are reversely inclined to the rotative axis of the inner ring or member 2 while the surfaces of the grooves or channels 9 and 10 of the inner ring or member 2 adjacent to the central enlargement 2ª present oppositely arranged shoulders opposite to said reversely inclined tracks or bearing surfaces 11, 11, so that said respective ball sets or series held in the grooves of said inner ring or member, are permitted to operate by their engagement between said reversely inclined tracks or bearing surfaces 11, 11, and the corresponding shoulders afforded by the surfaces of the grooves 9 and 10, to hold said inner ring or member securely against movement in an axial direction, so as to overcome effectually the effects of end thrust in either direction along the shaft whereon said inner ring or member is mounted.

The universal movement of the inner ring or member 2 and of its ball sets or series 7 and 8 around the oscillatory center point 12, and in contact with the internal spherical surfaces of the outer ring or member 1, enables the improved bearing to compensate automatically for any ordinary defect of alinement and to accommodate transverse strains placed upon the shaft whereon the inner ring or member is mounted, and the positioning of the respective ball sets or series 7 and 8 at opposite sides of said oscillatory center point 12 and in contact with the reversely inclined tracks or bearing surfaces 11, 11, not only affords an extremely strong and compact structure of the parts, but enables the device to be employed as a thrust bearing, since if endwise strain be applied to the shaft in one direction, as for example toward the right, as indicated by the arrow $a$ in Fig. 2, such endwise strain or thrust will be taken up and borne by the ball set or series 8 and the track 11, wherewith the same contacts, while if the thrust be in a reverse direction, as indicated by the arrow at $b$ in said figure, the same will be received and borne by the ball set or series 7 and its corresponding track or bearing surface 11.

If desired the central part of the inner surface of the outer ring or member 1 may be cut away as indicated at 14 in Fig. 2 so as to produce an annular groove or channel midway between the tracks 11, 11, whereat the annular ball series 7 and 8 travel in contact with said outer ring or member. The use of this cut away portion 14 is not in any way essential to my present invention, however.

The parts of the bearing being constructed in this manner, it is evident that the inner and outer members 2 and 1 are capable of universal turning movement relatively one to the other around the oscillatory center point 12 from which the internal spherical bearing surfaces 11, 11 of the outer ring or member are struck, and that when one of said rings or members is so turned or swung relatively to the other in a plane parallel with its axis, as, for example, to the positions shown in Figs. 1, 3 or 4, the balls 7 and 8 being held in any preferred way within the grooves or channels 9 and 10 of the inner member or ring, will be thrown outwardly from within the outer ring or member, so as to be freely removable in case any of such balls be worn or broken, after which, upon replacement of the balls, the rings or members may be re-adjusted so as to stand one within the other in position for use, the balls 7 and 8 being carried, by the relative turning of said rings or members during such readjustment, within and in accurate rolling contact with the spherical bearing surfaces of the respective tracks 11 11 of said outer ring or member 1.

It will be apparent that the universal turning movement of the rings or members above described permits of assembling the parts of the improved bearing with great facility despite the fact that the parts are held securely in relation when adjusted in position for use.

The improved bearing is rendered extremely strong, by reason of the inner and outer members or rings being each capable of formation from an integral piece of metal, and the construction is such as to permit a certain extent of swaying or gyratory movement of the shaft or other part in connection with which the improved bearing is used, so as to afford compensation in case such shaft or other part be bent or imperfectly adjusted.

The improved bearing constructed according to my invention is of an extremely simple and comparatively inexpensive nature and is particularly well adapted for use by reason of its strength and of the facility with which irregularities of movement of the rotating parts are accommodated, and it will also be obvious from the above description that the device is susceptible of some modification without material departure from the principles and spirit of the invention. For example, in some cases the construction shown in Fig. 5 may be adopted with good results, this construction being similar to that above described, except that three parallel series are employed, the inner ring or member 2 being provided with a central groove or channel 16 midway between the grooves or channels 9 and 10 and adapted to receive an annular series of balls 15 midway between the balls 7 and 8.

Having described my invention, what I claim and desire to secure by Letters Patent is:

The herein described improved ball bearing having inner and outer members each integrally formed from a single piece of metal, the inner member having a plurality of peripheral tracks extended around it affording oppositely arranged shoulders, and a plurality of ball sets arranged in said tracks of the inner member, the outer member having a concave spherical inner surface struck from a center point positioned at the rotative axis of the inner member and midway between the respective ball sets, and affording concentric tracks having spherical bearing surfaces reversely inclined to the rotative axis of the inner member and opposite to the shoulders afforded by the respective tracks of the inner member, the respective ball sets being interposed between said shoulders of the inner member and the respective reversely inclined bearing surfaces of the outer member to transmit end thrust imposed upon said inner member, and said inner member being capable of universal turning movement around said center point to facilitate the introduction and withdrawal of the ball sets within and from said outer member.

In witness whereof, I have hereunto signed my name in the presence of two subscribing witnesses.

SVEN GUSTAF WINGQUIST.

Witnesses:
BENGT W. FJELLMAN,
G. HENRIKSSON.